United States Patent [19]

Ford

[11] Patent Number: 5,097,704
[45] Date of Patent: Mar. 24, 1992

[54] ADJUSTABLE MEASURING DEVICE

[75] Inventor: David F. Ford, Springfield, Ill.

[73] Assignee: Bunn-O-Matic Corporation, Springfield, Ill.

[21] Appl. No.: 653,764

[22] Filed: Feb. 11, 1991

[51] Int. Cl.⁵ .................. B65D 88/54; G01F 19/00
[52] U.S. Cl. ............................ 73/429; 221/268; 222/305; 222/438
[58] Field of Search ............. 73/429; 222/361, 362, 222/305; 221/268

[56] References Cited

U.S. PATENT DOCUMENTS

| | | | |
|---|---|---|---|
| 4,162,751 | 7/1979 | Hetland et al. | 222/305 |
| 4,166,487 | 9/1979 | Spies | 73/429 X |
| 4,607,200 | 8/1986 | Zimmerman | . |
| 4,779,521 | 10/1988 | Brumfield | 222/307 X |
| 4,955,510 | 9/1990 | Newman | 222/361 X |

Primary Examiner—Daniel M. Yasich
Attorney, Agent, or Firm—Trexler, Bushnell, Giangiorgi & Blackstone

[57] ABSTRACT

The adjustable measuring device of the present invention has a housing containing an arcuate chamber guide having movable plates attached to it so as to define a metering chamber of variable size. The housing has a housing inlet at the top, communicating with a chamber inlet, and a housing outlet at the bottom, communicating with the metering chamber. An amount, predetermined by the size of the metering chamber, of material to be ground leaves a hopper, and enters the metering chamber through the housing inlet and the chamber inlet. The housing is slid, thereby closing the hopper, until the housing outlet is positioned over a grinding area. Then, the material is discharged into the grinding area to be ground.

17 Claims, 2 Drawing Sheets

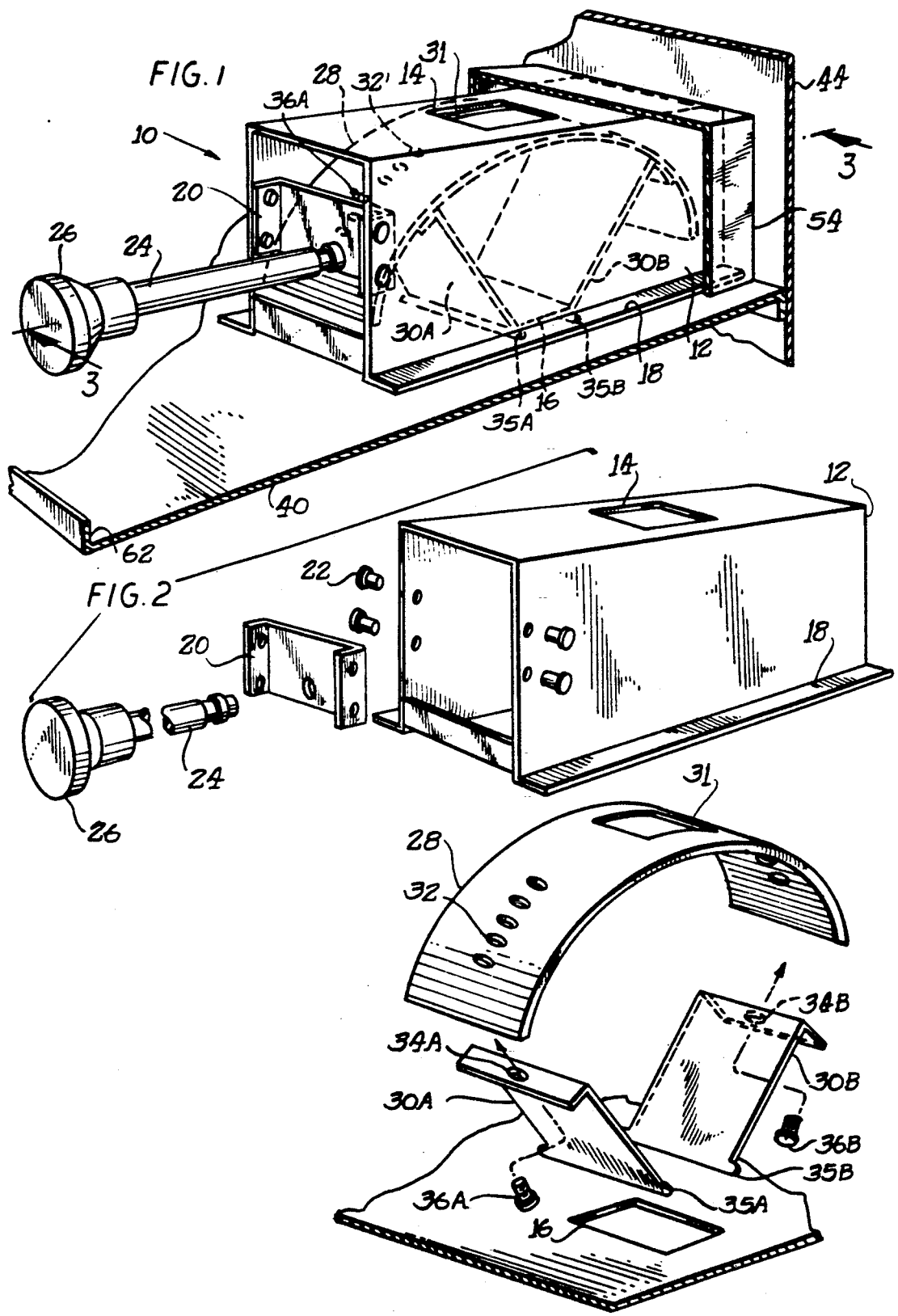

ADJUSTABLE MEASURING DEVICE

BACKGROUND AND SUMMARY OF THE INVENTION

This invention relates generally to an adjustable measuring device for use with grinding mechanisms, such as coffee bean grinders and the like. These measuring devices are highly desirable items, particularly considering the commercial applications of many grinding mechanisms.

Many coffee shops, and other purveyors of ground material, often sell their ground goods at a predetermined price for a predetermined amount. Furthermore, customers of such shops are insistent that the coffee, or other material, be ground freshly, often in their presence. Due to these demands, a shop employee must first measure out the amount of coffee beans that the customer requested, and then grind that amount into grounds. This practice generally increases the amount of time that an employee must spend with each customer, and thereby reduces the amount of revenue generated by the shop. Alternatively, a direct-feed grinder, wherein a hopper containing the coffee beans communicates with the grinding mechanism, is employed whereby the amount of coffee beans ground is determined by the operation time of the grinder. This practice, however, is often inaccurate, again resulting in lost revenue to the shop.

For these reasons, as well as many others, it is desirable to have an accurate device that can assist in performing these functions, in order to save time, and increase revenue. Specifically, it is desirable to have a measuring device that can be set at a predetermined value in order to dispense a specific amount of coffee beans. Further, such a measuring device would be preferably variable, so that the same device can be used to dispense different amounts of material for grinding. Finally, such a device must be simple to use, so that a customer can service himself effectively, thus freeing the shop employee to produce higher revenues.

OBJECTS AND SUMMARY OF THE INVENTION

A general object of the present invention is to provide a measuring device which can deliver a predetermined amount of material to a grinder.

Another object of the invention is to provide a measuring device that can be set variably to determine different amounts of material.

A further object of the invention is to provide a measuring device for use with coffee bean grinders that is simple for a customer to use, allowing the customer to service himself effectively.

The adjustable measuring device of the present invention has a housing containing a metering chamber having a movable plate so that the size of the metering chamber can be varied. The metering chamber has a chamber inlet which communicates with a housing inlet on the top of the housing, and has plates communicating to a housing outlet in the bottom of the housing.

The plates are mounted pivotally about the housing outlet. An amount, predetermined by the size of the metering chamber, of material to be ground leaves a hopper, and enters the metering chamber through the opening on the top of the housing, and the chamber inlet. The housing is slid, thereby closing the hopper, until the housing outlet is positioned over a grinding area. Then, the material is discharged into the grinding area to be ground. This process merely involves the sliding actuation of a push rod, and, therefore, allows a customer to service himself, without the need of aid from another.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a perspective view of an adjustable measuring device constructed according to the teachings of the present invention;

FIG. 2 is an exploded view of the adjustable measuring device shown in FIG. 1, showing the particular construction of the device;

DETAILED DESCRIPTION OF THE PREFERRED EMBODIMENT

Figure 3:
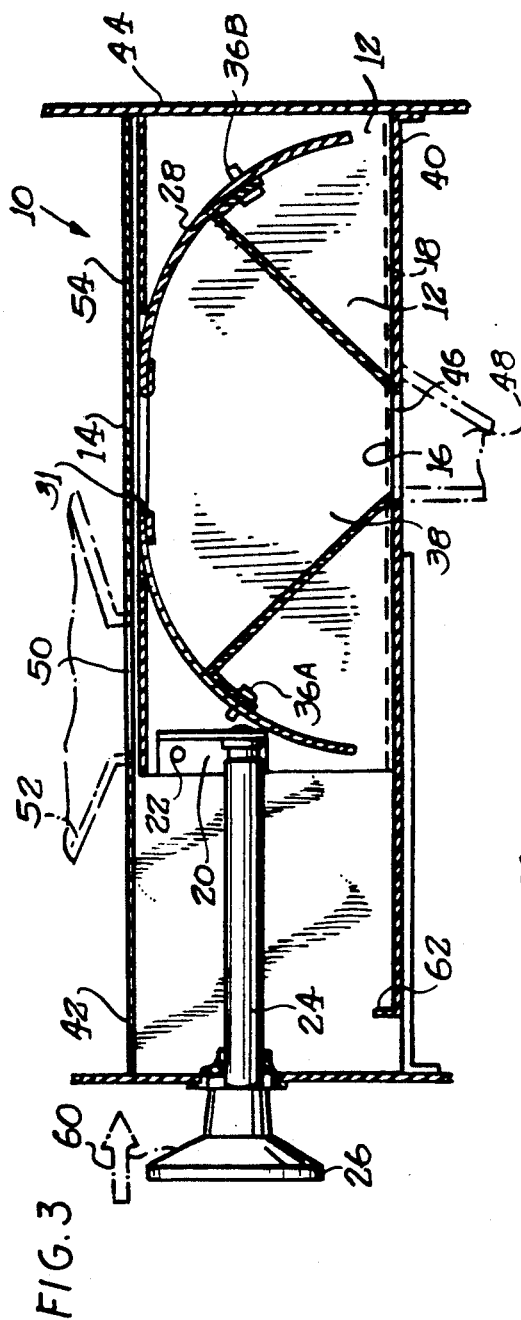
FIG. 3 is a cut-away sectional view, taken along line 3—3 of FIG. 1, with the housing outlet communicating with the grinding area.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. While the invention will be described with respect to its employment in a coffee bean grinder, it is to be understood that the invention is not to be limited to that employment.

Referring generally to FIG. 1 and FIG. 2, an adjustable measuring device 10, constructed according to the teachings of the present invention, is disclosed. The adjustable measuring device 10 comprises a housing 12 having a housing inlet 14, and a housing outlet 16 disposed about the housing 12.

The housing 12 also has rails 18 disposed about the bottom of the housing 12, the rails 18 being constructed so as to facilitate sliding of the adjustable measuring device 10. On one end of the housing 12, a push bracket 20 is mounted to the housing 12 by means of mounting studs 22. A push rod 24, at one end, is connected to the push bracket 20, and, at the opposing end, the push rod 24 is connected to a knob 26. The knob 26 is constructed so as to be able to accept a force, and communicate that force to the push rod 24. The push rod 24 is of a particular design so that the push rod 24 can apply a force to the push bracket 20, thereby causing the housing 12 to translate.

On the interior of the housing 12 are disposed an arcuate chamber guide 28, and plates 30A and 30B. The arcuate chamber guide 28 has plate mounting apertures 32 and a chamber inlet 31 disposed through its surface. The plates 30A and 30B each have a screw aperture 34A and 34B, and a plurality of tabs 35A and 35B. The tabs 35A and 35B are designed to be inserted into the housing 12 adjacent to the outlet 16. In this manner, the plates 30A and 30B are capable of pivotal rotation about the tabs 35A and 35B through a plurality of positions.

The screw apertures 34A and 34B are threaded, and are of sufficient diameter to accept plate screws 36A and 36B, and the plate mounting apertures 32 are constructed so that the plate screws 36A and 36B can project therein when they are threaded through the screw apertures 34A and 34B. By these means, the plates 30A and 30B are capable of being mounted firmly on the chamber guide 28 in a plurality of positions dictated by the disposition of the plate mounting apertures 32.

The plates 30A and 30B, when mounted, communicate from the chamber guide 28 to the edges of the housing outlet 16. With the plates 30A and 30B being mounted on the chamber guide 28, communicating to the edges of the housing outlet 16, and held there by means of the tabs 35A and 35B, a metering chamber 38 is defined. Due to the various possible positions of the plates 30A and 30B, the volume contained within the metering chamber 38 is variable. The housing inlet 14 and the chamber inlet 31 allow a predetermined amount of material to be ground to enter the metering chamber 38, and the housing outlet 16 allows that predetermined amount of material to leave the metering chamber 38.

Figure 4:
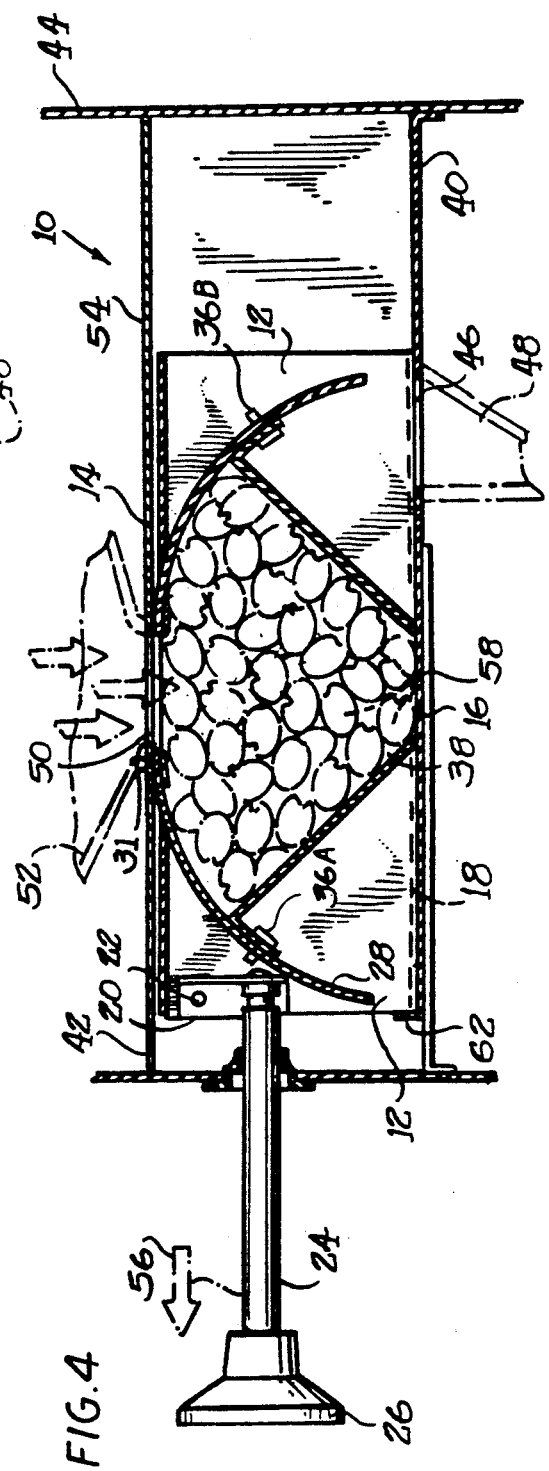
FIG. 4 is a cut-away sectional view, taken along line 3—3 of FIG. 1, with the housing inlet and the chamber inlet communicating with the hopper, allowing a predetermined amount of material to enter the metering chamber.

In the specific embodiment illustrated, the entire adjustable measuring device 10 is disposed within a grinding mechanism, of known construction, such as that disclosed in the patent of Zimmerman, U.S. Pat. No. 4,607,200, assigned to the assignee of the present invention, and only partially shown. As illustrated in FIG. 1, FIG. 3, and FIG. 4, the grinding mechanism has a bottom panel 40, a top panel 42, and a rear panel 44. The bottom panel 40 is substantially horizontal and smooth. The housing 12 slidably contacts the bottom panel 40. The bottom panel 40 has an opening 46 which communicates with a grinding area 48, shown partially in phantom in FIG. 3 and FIG. 4, where means for grinding material are disposed. The size and disposition of the opening 46 is similar to that of the housing outlet 16, and allows a material to translate from the metering chamber 38 to the grinding area 48, when the housing 12 is in proper position.

The top panel 42 is disposed above, and is substantially parallel to the bottom panel 40, and has an opening 50 which communicates with a hopper 52, shown partially in phantom in FIG. 3 and FIG. 4, where material to be ground is held until needed. The size and disposition of the opening 50 is similar to that of the housing inlet 14, and the chamber inlet 31, and allows material to translate from the hopper 52, through the housing inlet 14, and the chamber inlet 31, into the metering chamber 38, when the housing 12 is in proper position.

As shown in FIG. 1, the rear panel 44 is substantially vertical, and thus, substantially perpendicular to the top panel 42 and the bottom panel 40. The rear panel 44 joins the top panel 42 to the bottom panel 40. There is a guide portion 54 disposed on the interior of the rear panel 44 which connects the rear panel 44 to the bottom panel 40. The guide portion 54 is constructed so as to restrict and direct the translation of the adjustable measuring device 10. The guide portion 54 assures that the adjustable measuring device 10 will translate in a proper fashion between the point at which the housing outlet 14 engages the opening 46 in the bottom panel 40, as shown in FIG. 3, and the point at which the housing inlet 14 and the chamber inlet 31 engage the opening 50 in the top panel 42, as shown in FIG. 4.

The operation of the adjustable measuring device 10 will become more apparent in the following discussion. Referring to FIG. 3, an adjustable measuring device 10 with an empty metering chamber 38 is shown. The housing 12 is in contact with the opening 50 in the top panel 42, thereby effectively sealing the opening 50. This particular configuration does not allow any material to flow out of the hopper 52 through the opening 50.

When an operator wishes to employ the adjustable measuring device 10, he applies a pulling force 56, shown by the horizontal arrow in FIG. 4, to the knob 26 of the push rod 24. The push rod 24 communicates the pulling force 56 to the housing 12 at the push bracket 20, thus causing the housing 12 to translate in the direction of the force 56. The housing 12 translates a certain distance, sliding along the bottom panel 40 by means of the rails 18, until the housing inlet 14 and the chamber inlet 31 communicate with the opening 50 of top panel 42, which communicates with the hopper 52. The housing 12 is prevented from translating forwardly past the point at which the housing inlet 14 and the chamber inlet 31 communicate with the opening 50 by means of a stop portion 62 disposed about the bottom panel 40.

In this position, the housing 12 is in contact with the opening 46 of the grinding area 48, and the bottom panel 40 is in contact with the housing outlet 16, effectively sealing both the opening 46 and the housing outlet 16. This disposition allows coffee beans 58 to translate, under the influence of gravity, from the hopper 52, through the opening 50, the housing inlet 14 and the chamber inlet 31, into the metering chamber 38. Because the volume of the metering chamber 38 is fixed, as defined by the plates 30A and 30B, the metering chamber 38 will accept only a specified amount of coffee beans 58, as shown in FIG. 4. The disposition of the plates 30A and 30B in the plate mounting apertures 32 on the chamber guide 28 can be altered independently so as to change the volume of the metering chamber 38.

Once the metering chamber 38 has filled with coffee beans 58, the operator then applies a pushing force 60, shown by the horizontal arrow in FIG. 3, to the knob 26 of the push rod 24. The push rod 24 communicates the pushing force 60 to the housing 12 at the push bracket 20, thus causing the housing 12 to translate in the direction of the force 60. The housing 12 translates a certain distance, sliding along the bottom panel 40 by means of the rails 18, until the housing outlet 16 communicates with the opening 46 of the grinding area 48. The housing is prevented from translating backwardly past the point at which the housing outlet 16 communicates with the opening 46, which communicates with the grinding area 48.

In this position, the housing 12 is in contact with the opening 50 of the hopper 52, and the top panel 42 is in contact with the housing inlet 14, and the chamber inlet 31, thereby effectively sealing the opening 50 of the hopper 52, the housing inlet 14, and the chamber inlet 31 This disposition allows the coffee beans 58 to translate, under the influence of gravity, from the metering chamber 38, through the housing outlet 16, into the grinding area 48, where the coffee beans 58 are processed into coffee grounds.

If it is desired to change the volume of the metering chamber 38, the operator must loosen the plate screws 36A and 36B, and remove them from the plate mounting apertures 32. With the plate screws 36A and 36B loosened, the plates 30A and 30B are capable of free pivotal rotation about the tabs 35A and 35B. Now, the operator rotates the plates 30A and 30B, thus varying the volume of the metering chamber 38. When the desired volume has been attained, the operator then replaces the plate screws 36A and 36B through the screw apertures 34A and 34B in the plates 30A and 30B, and tightens the plate screws 36A and 36B in the plate mounting apertures 32. This being done, the adjustable measuring device 10 again is capable of use, as outlined above, but this time, in delivering a different volume of coffee beans 58 to the grinding area 48. Because the metering chamber 38 can deliver only a predetermined amount of coffee beans 58 to the grinding area 48, only a specified amount of coffee grounds will result. Also, the guide portion 54 assures that the housing 12 will translate only between the point of communication with the hopper 52 and the point of communication with the grinding area 48. This construction of the adjustable measuring device 10 allows a customer to service himself effectively, and insures that the same amount of coffee beans 58 will be ground each time, thus eliminating the need to weigh each lot separately. This reduces the amount of time that an employee must spend with each customer, resulting in greater efficiency of a coffee shop, and increased revenue.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. An adjustable measuring device for use with a coffee bean grinder comprising: a metering chamber having an inlet and an outlet; a at least one plate defining one side of the chamber; and the plate being pivotal about a tab or a point adjacent to the outlet for adjusting the volume of the metering chamber.

2. An adjustable measuring device as defined in claim 1 wherein a second plate defines a second side of the metering chamber opposite from the one side; the second plate being pivotal about a second point adjacent to the outlet for adjusting the volume of the metering chamber.

3. An adjustable measuring device as defined in claim 1 wherein the metering chamber has means for translating, so that material can flow into and out of the metering chamber at different positions.

4. An adjustable measuring device as defined in claim 1 wherein a chamber guide defines one side of the chamber, and the plate is mountable on the chamber guide in a plurality of positions.

5. An adjustable measuring device for use with a coffee bean grinder comprising: a housing having a housing inlet and a housing outlet; a chamber guide and an insertable plate disposed within the housing; the chamber guide having a plurality of plate mounting apertures, and a chamber inlet disposed through the chamber guide; the plate communicating from the housing outlet to the chamber guide; a screw disposed on the plate; the plate being mountable on the chamber guide by selective insertion of the screw into one of the plurality of plate mounting apertures; the plate and the chamber guide defining a adjustable metering chamber; and the chamber inlet being disposed inside the housing so that the chamber inlet communicates with the housing inlet.

6. An adjustable measuring device as defined in claim 5 wherein the housing has a push bracket, which is capable of accepting a force, connected to the housing so that the force can be transmitted to the housing thereby causing the housing to translate under the influence of the force.

7. An adjustable measuring device as defined in claim 5 wherein the chamber guide is arcuate in shape.

8. An adjustable measuring device as defined in claim 6 wherein a push rod having a knob is connected to the push bracket so as to facilitate the application of a force to the housing.

9. An adjustable measuring device as defined in claim 5 wherein the housing is disposed above, and translates upon a panel of a coffee grinder; and a top portion is disposed on the panel so as to restrict the translation of the housing.

10. An adjustable measuring device as defined in claim 5 wherein a guide portion is disposed on the housing so as to restrict the translation of the housing.

11. An adjustable measuring device as defined in claim 5 wherein the plate has screw apertures capable of accepting screws for projecting therethrough, and engaging the plate mounting apertures in the chamber guide.

12. An adjustable measuring device as defined in claim 5 wherein the plate has tabs thereon, the tabs being insertable into the housing adjacent to the housing outlet so that the plates are capable of pivotal rotation about a point adjacent to the housing outlet.

13. An adjustable measuring device for use with a coffee bean grinder comprising: a housing having an inlet and an outlet; the housing being movable between a first position with the inlet communicating with a source of material to be ground, and a second position with the outlet in communication with an opening; an arcuate chamber guide disposed within the housing and depending from adjacent the inlet; an insertable plate disposed within the housing and having a lower end pivotally mounted adjacent the outlet and an upper end adjustably positioned adjacent the guide; means acting between the plate and the movable housing for positively releasably locking the plate in an adjusted position; and the plate and guide defining an adjustable metering chamber communicating with the housing inlet and outlet.

14. An adjustable measuring device as defined in claim 13 wherein a second plate defines a second side of the adjustable metering chamber opposite from a first side defined by the first mentioned plate; the second plate being pivotal about a second point adjacent the outlet for adjusting the volume of the metering chamber.

15. An adjustable measuring device as defined in claim 13 wherein the adjustable metering chamber has means for moving the chamber so that material can flow into and out of the metering chamber at different positions.

16. An adjustable measuring device as defined in claim 13 wherein the arcuate chamber guide defines one side of the chamber, and the plate is mountable on the chamber guide in a plurality of positions.

17. An adjustable measuring device as defined in claim 13 wherein the means comprises a screw extending between the plate and the chamber guide.

* * * * *